(12) United States Patent
Wagner et al.

(10) Patent No.: US 8,317,931 B1
(45) Date of Patent: Nov. 27, 2012

(54) NANOTUBULAR TITANIA FOR DECONTAMINATION OF CHEMICAL WARFARE AGENTS AND TOXIC INDUSTIAL CHEMICALS

(75) Inventors: George W. Wagner, Elkton, MD (US); Yue Wu, Chapel Hill, NC (US); Alfred Kleinhammes, Chapel Hill, NC (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 1647 days.

(21) Appl. No.: 11/668,524

(22) Filed: Jan. 30, 2007

Related U.S. Application Data

(60) Provisional application No. 60/806,861, filed on Jul. 10, 2006.

(51) Int. Cl.
*B08B 7/00* (2006.01)

(52) U.S. Cl. .................................. 134/7; 134/6; 134/42
(58) Field of Classification Search ................. 134/6, 7, 134/42
See application file for complete search history.

(56) References Cited

U.S. PATENT DOCUMENTS

| | | | | |
|---|---|---|---|---|
| 4,443,309 | A | * | 4/1984 | Van Duin et al. ............. 588/303 |
| 6,566,300 | B2 | * | 5/2003 | Park et al. ..................... 502/350 |
| 6,569,353 | B1 | * | 5/2003 | Giletto et al. ............. 252/186.28 |
| 2004/0109853 | A1 | * | 6/2004 | McDaniel .................... 424/94.6 |

OTHER PUBLICATIONS

Kleinhammes, A., et al "Decontamination of 2-chloroethyl Ethylsulfide Using Titanate Nanoscrolls", Chemical Physics Letters 411 (2005) 81-85.

* cited by examiner

*Primary Examiner* — Bibi Carrillo
(74) *Attorney, Agent, or Firm* — Ulysses John Biffoni

(57) ABSTRACT

The invention relates to methods and products enabling decontamination of chemical warfare agents and/or toxic industrial chemicals. More particularly, the invention pertains to improvements of surface decontamination processes using novel sorbents such as nanotubular titania.

10 Claims, 1 Drawing Sheet

| Agent | Alumina | Nanotubular Titania | Nanotubular w/ Added Water | Anatase | Anatase w/ Added Water |
|---|---|---|---|---|---|
| HD | 18.2 hours | 1.8 days | 3.70 hours | ------ | ---------- |
| GD | 2.7 hours | 18.2 hours | 1.83 hours | ------ | ---------- |
| VX | 15.0 hours | 58.0 minutes | 24.70 minutes | 4.3 hours | 10.5 days |

| Agent | Alumina | Nanotubular Titania | Nanotubular w/ Added Water | Anatase | Anatase w/ Added Water |
|-------|---------|--------------------|-----------------------------|---------|------------------------|
| HD    | 18.2 hours | 1.8 days | 3.70 hours | ------ | ---------- |
| GD    | 2.7 hours | 18.2 hours | 1.83 hours | ------ | ---------- |
| VX    | 15.0 hours | 58.0 minutes | 24.70 minutes | 4.3 hours | 10.5 days |

NANOTUBULAR TITANIA FOR DECONTAMINATION OF CHEMICAL WARFARE AGENTS AND TOXIC INDUSTIAL CHEMICALS

CROSS-REFERENCE TO RELATED APPLICATIONS

This application claims the benefit of priority from U.S. provisional patent application Ser. No. 60/806,861 filed on Jul. 10, 2006.

GOVERNMENT INTEREST

The invention described herein may be manufactured, used, and licensed by or for the United States Government.

FIELD OF THE INVENTION

This invention relates to reactive sorbents and methods of making and using the same for the decontamination of surfaces contaminated with highly toxic agents, including chemical warfare ("CW") agents and/or industrial chemicals, insecticides, and the like. More particularly, the invention relates to improvements of surface decontamination processes and reagents by the development and use of novel sorbents and sorbent preparation methods, comprising titania such as nanotubular titania.

BACKGROUND OF THE INVENTION

Exposure to toxic agents, and especially CW agents, and related toxins, is a potential hazard to the armed forces and to civilian populations, since CW agents are stockpiled by several nations, and other nations and groups actively seek to acquire these materials. Some commonly known CW agents are bis-(2-chloroethyl)sulfide (HD or mustard gas), pinacolyl methylphosphonofluoridate (GD) and 0-ethyl S-(2-diisopropylamino)ethyl methylphosphonothioate (VX), as well as analogs and derivatives of these agents. More generally, these types of chemical warfare agents are referred to as H, G, and V type agents. These CW agents are generally delivered as fine aerosol mists which, aside from presenting an inhalation threat, will deposit on surfaces of military equipment and hardware, including uniforms, weapons, vehicles, vans, and shelters. Once such equipment and hardware is contaminated with one of the previously mentioned highly toxic agents, the agent must be removed in order to minimize contact hazards.

For this reason, there is an acute need to develop and improve technology for decontamination of highly toxic materials. This is especially true for the class of toxic agents known as nerve agents or nerve gases which are produced and stockpiled for both industrial use and as CW agents. Simply by way of example, one class of nerve agents with a high level of potential lethality is the class that includes organophosphorus-based ("OP") compounds, such as the G-agents Sarin and Soman, and the V-agent VX. Such agents can be absorbed through inhalation and/or through the skin of an animal or person. The organophosphorus-type ("OP") CW materials typically manifest their lethal effects against animals and people by inhibiting acetylcholineseterase ("AChE") enzyme at neuromuscular junctions between nerve endings and muscle tissue to produce an excessive buildup of the neurotransmitter acetylcholine, in an animal or person. This can result in paralysis and death in a short time.

In addition to the concerns about CW agents, there is also a growing need in the industry for decontamination of industrial chemicals and/or insecticides, for example, ACHE-inhibiting pesticides such as parathion, paraoxon and malathion, among others. Thus, it is very important to be able to effectively detoxify a broad spectrum of toxic agents, including, but not limited to, organophosphorus-type compounds, from contaminated surfaces and sensitive equipment.

One decontamination material used by the U.S. Army, is XE555 resin (Ambergard™ Rohm & Haas Company, Philadelphia, Pa.). XE555 is presently being used by the military for immediate decontamination applications. The objective of immediate decontamination operations is to remove toxic agents from the contaminated surface as rapidly as possible. However, XE555 has several disadvantages. Although effective at removing chemical agents, XE555 does not possess sufficient reactive properties to neutralize the toxic agent(s) picked up by this resin. Thus, after use for decontamination purposes, XE555 itself presents an ongoing threat from off-gassing toxins and/or vapors mixed with the resin. In addition, XE555 is relatively expensive in the quantities required for decontamination purposes. Other reactive sorbents used by the army are "A-200", an alumina-based material used in the M100 Sorbent Decontamination System. Although both of these solid-phase decontaminates are able to quickly remove CW agents from surfaces, they suffer from slow reactions with CW agents such as GD, HD, and VX (compared to typical liquid-phase decontaminants). Thus the contaminated sorbents present a persistent hazard themselves following their use. This is particularly true for VX, the most persistent and toxic of these agents. Clearly, improved sorbents are required to eliminate this potential secondary contamination hazard present by current, conventional sorbents following their use.

SUMMARY OF THE INVENTION

Accordingly, it is an object of the present invention to meet the foregoing needs by providing reactive sorbents that are able to effectively decontaminate CW agents and minimize the creation of secondary hazards. Such reactive sorbents of the present invention are, for example, based on nanotubular titania.

One embodiment of the present invention is a method of decontaminating a surface believed to be contaminated with one or more toxic agents, wherein said method comprises: contacting said contaminated surface with nanotubular titania. The one or more toxic agent(s) is preferably selected from the group consisting of bis-(2-chloroethyl) sulfide; pinacolyl methylphosphonofluoridate; 0-ethyl S-(2-diisopropylamino) ethyl methylphosphonothioate, or a combination thereof and it is preferred that the nanotubular titania is a powder.

Another embodiment of the present invention is a method of decontaminating a surface believed to be contaminated with one or more toxic agents, wherein said method comprises: contacting said contaminated surface with a sorbent comprising nanotubular titania. The sorbent may contain water, preferably in the range of 15 to 20 weight percent of water. The one or more toxic agent(s) is preferably selected from the group consisting of bis-(2-chloroethyl) sulfide; pinacolyl methylphosphonofluoridate; 0-ethyl S-(2-diisopropylamino)ethyl methylphosphonothioate, or a combination thereof.

Another embodiment of the present invention is a method of decontaminating a surface believed to be contaminated with one or more toxic agents, wherein said method comprises: contacting said contaminated surface with a material including a sorbent, wherein the sorbent comprises nanotubular titania. The material may comprise a fabric having in the range of 100 grams to 400 grams of sorbent, preferably 300 grams of sorbent. The sorbent may comprise 100 percent nanotubular titania, approximately 100 percent nanotubular titania, or a mixture of nanotubular titania and water. The material or fabric may be in the shape of a mitt or any shape a user may find easy to hold so that the user may easily contact the material to a contaminated surface resulting in the sorbent passing through the material and being deposited on said contaminated surface.

Another embodiment of the present invention is a kit comprising, a material comprising a sorbent, wherein the sorbent comprises nanotubular titania. It is preferred that the material is in a package.

BRIEF DESCRIPTION OF THE INVENTION

FIG. 1 Observed half-lives of CW agents deposited on Nanotubular Titania, Conventional Titania (Anatase), and Alumina.

DETAILED DESCRIPTION OF THE INVENTION

Reference will now be made to preferred embodiments of this invention, examples of which will be obvious from the detailed description of the invention. The present invention relates to methods and products for removing and deactivating a wide range of highly toxic materials, including CW agents. In order to appreciate the scope of the invention, the terms "toxin," "toxic agent," and "toxic material," are intended to be equivalent, unless expressly stated to the contrary. In addition, the terms, "nerve gas," "nerve agent," "neurotoxic," and the like are intended to be equivalent, and to refer to a toxin that acts or manifests toxicity, at least in part, by disabling a component of an animal nervous system, e.g., ACH inhibitors, as discussed supra.

The term "HD" shall mean bis-(2-chloroethyl) sulfide or mustard gas. The term "GD" shall mean pinacolyl methylphosphonothioate and the term "VX" shall mean 0-ethyl S-(2-diisopropylamino)ethyl methylphosphonothioate. The terms "titania," "conventional titania," and "anatase" shall mean the same substance.

Nanotubular Titania

Sorbents of the present invention may be made entirely of, or include nanotubular titania, a nanoscale material that possesses significantly different properties than its counterpart titania. Nanotubular titania can be produced using the methods taught in "Decontamination of 2-Chloroethyl Ethylsulfide Using Titanate Nanoscrolls," Chemical Physics Letters, Vol 411, 2005, 81-85, by Alfred Kleinhammes, George W. Wagner, Harsha Kulkarni, Yuanyuan Jia, Qi Zhang, Lu-Chang Qin, and Yue Wu, herein incorporated by reference in its entirety.

Although many metal oxides have proven effective for decontamination of HD, and even GD, testing of these same metal oxides has found them not nearly as effective for decontamination of V agents. The chemistry of HD is very different from V and G agents, and previously tested oxides have exhibited good reaction with HD, and even G agents, but they react exceedingly slow with VX. In contrast, nanotubular titania has unexpectedly been found to be the exception to the rule, exhibiting excellent reactivity with VX, thereby proving to be an effective and safe decontaminant for all three major types of chemical warfare agents.

Nanotubular titania is surprisingly more effective in the decontamination of all three major types of chemical warfare agents such HD, GD, and VX, and is particularly efficacious compared to sorbents including conventional titania and/or alumina. In addition, most sorbents are deactivated when contacted with water, such as water contamination, or ambient moisture. For example, metal oxides such as MgO, CaO, and alumina have been fashioned into nanoparticles. However, these metal oxide nanoparticles have proven unstable in the presence of air and/or moisture. Surprisingly, the addition of water, water contamination, or ambient moisture does not deactivate sorbents of the present invention. Instead, the addition of water serves to enhance the reactivity of nanotubular titania with all CW agents tested, as shown in Example 1.

It is preferred the nanotubular titania used in the present invention exhibit nanoscale tubular structures reminiscent of rolled-up paper scrolls. This unique structure provides for a much greater surface area than even "normal" nanocrystalline titania. Additionally, its tubular structure prevents tight packing in macroscopic aggregates; thus preserving its high surface area and porosity. It is thought the reasons the sorbents of the present invention have unexpected and beneficial characteristics is based on this nanotubular titania structure. Further, the nanotubular form is also air stable, suggesting that it is equally robust and bio-compatible/non-toxic as its conventional, edible titania cousin; thus inadvertent ingestion is not expected to be harmful. Titania is known to be extremely stable and able to pass through human digestion unscathed; thus it is approved for inclusion in food items such as cookie icing. An additional benefit of using nanotubular titania in (as) a sorbent is its non-toxic nature even if it is ingested by humans.

Sorbents Including Nanotubular Titania

Sorbents of the present invention preferably contain 100% nanotubular titania, approximately 100% nanotubular titania, or a combination of nanotubular titania and other components. Other sorbents could be mixed with nanotubular titania; but such mixtures are not preferred if the other sorbents have unwanted characteristics and would result in mixtures absorbing CW agents without decontamination (i.e. a secondary hazard) or having air/moisture instability, etc.

Nanotubular titania is compatible with the XM100 Sorbent Decontamination System (SDS). The SDS is described in "Formal Test Report for the XM100 Sorbent Decontamination System (SDS): Decontamination/Laboratory Testing, WDTC-TR-01-037; West Desert Test Center, U.S. Army Dugway Proving Ground, November 2002." Nanotubular titania could be employed as a drop-in replacement (i.e. substitute) for the A-200 sorbent currently utilized in the XM100 SDS. This conventional kit consists of 300 g A-200 sorbent contained in a car wash-style mitt, which is sealed in a foil pack. Instead of 300 g A-200 sorbent, the mitt, or material, would preferably include 300 g of nanotubular titania. The material, mitt, may include in the range of 100 grams to 400 grams of nanotubular titania. To use this kit, the foil pack is torn open, the mitt is remove and place over the user's (gloved) hand, and simply rubbed over the surface to be decontaminated. During rubbing, the sorbent (i.e. nanotubular titania) passes through the woven material of the mitt to deposit on the surface. The mitt maybe made of conventional materials and can be purchased as an off-the-shelf commercial item. The mitt acts as a convenient carrier/applicator for the sorbent.

Use of Sorbent

Nanotubular titania powder can be employed to decontaminate surfaces in the same manner as other reactive sorbents such as XE-555 and A-200. The powder can be simply sprinkled, poured or sprayed onto the surface, and then rubbed to enhance contact, and mixing, with liquid contaminants. In addition, nanotubular titania and other components may be manufactured as a mitt, and used as described above.

EXAMPLE

Decontamination Using Nanotubular Titania

Nanotubular titania was contacted with drops of neat HD, GD and VX, to determine the rate of reactions of these agents with the sorbent. Conventional titania, or anatase, was also contacted with drops of VX to verify the apparent advantages afforded by nanotubular titania for the accelerated decontamination of this agent. Observed half-lives for these reactions are shown in FIG. 1. Water was added to both nanotubular titania and the conventional titania to demonstrate its impact on CW agent reactivity. Data for alumina is also included to show the advantages of titania, in general, over this current sorbent material. As shown in FIG. 1, and looking at the column labeled "Alumina", the data illustrates the persistent problem of long half lives of CW agents when a current reactive sorbent is used. The half life of GD on Alumina is 2.7 hours, the half life of HD on alumina is 18.2 hours, and the half life of VX on alumina is an astounding 15.0 days. VX, the most persistent of these CW agents, is typically the slowest to react with sorbents, and alumina is no exception to this rule. Yet the reaction of VX on conventional titania is orders of magnitude faster as the observed half-life of alumina, which is the half life of VX on conventional titania (anatase) is 4.3 hours compared to the half life of VX on alumina of 15 days. Thus conventional titania, itself, offers a considerable reactive advantage over alumina where VX is concerned.

Nanotubular titania affords further improvements in reactivity towards VX than conventional titania (anatase). The half life of VX on nanotubular titania is 58 minutes compared to the half life of VX on convention titania (anatase), which exhibits a half-life of only 4.3 hours. Furthermore, it is evident that the nanotubular titania reactivity is rather unique since, for a given sorbent, VX typically reacts much slower than either HD or GD. Yet VX deposited on nanotubular titania actually reacts faster than either HD or GD. The addition of water (15-20% by weight) to the nanotubular titania accelerates the rate of reaction of all the agents, whereas on other sorbents, water or moisture can seriously degrade their performance. Such is the case for conventional titania where water causes a dramatic increase in the VX half-life from 4.3 hours to 10.5 days. Solid State NMR was used to monitor the reactions of VX, GD and HD with the reactive sorbents in situ as previously described (Wagner et al. J. Am. Chem. Soc. 123, 2001, 1636-1644).

In conclusion, nanotubular titania is effective in decontamination of all three major types of chemical warfare agents such as HD, GD, and VX, and is particularly efficacious toward the latter agent compared to contemporary reactive sorbents such as alumina. Another advantage of nanotubular titania is that water contamination or ambient moisture does not deactivate the sorbent, rather it serves to enhance the reactivity toward all the agents tested.

Although the present invention has been described in detail with reference to examples above, it is understood that various modifications can be made without departing from the spirit of the invention. Accordingly, the invention is limited only by the following claims. All cited patents, patent applications and publications referred to in this application are herein expressly incorporated by reference in their entirety.

What is claimed is:

1. A method of decontaminating a surface contaminated with one or more toxic agents, wherein said method comprises: decontaminating said surface by contacting said contaminated surface with nanotubular titania, and wherein said toxic agents are selected from the group consisting of pinacolyl methylphosphonofluoridate; 0-ethyl S-(2-diisopropylamino)ethyl methylphosphonothioate, or a combination thereof.

2. The method of claim 1, wherein said nanotubular titania is a powder.

3. The method of claim 1, wherein said nanotubular titania further comprises water.

4. The method of claim 3, wherein said nanotubular titania comprises 15 to 20 weight percent of said water.

5. A method of decontaminating a surface contaminated with one or more toxic agents selected from the group consisting of pinacolyl methylphosphonofluoridate: 0-ethyl S-(2-diisopropylamino)ethyl methylphosphonothioate, or a combination thereof, wherein said method comprises: decontaminating said surface by contacting said contaminated surface with a fabric material comprising nanotubular titania.

6. The method of claim 5, wherein said fabric material comprises 100 grams to 400 grams of said nanotubular titania.

7. The method of claim 5, wherein said fabric material comprises 300 grams of said nanotubular titania.

8. The method of claim 5, wherein said nanotubular titania further comprises water.

9. The method of 5, wherein said fabric material comprises a woven fabric in the shape of a mitt.

10. The method of claim 5, wherein contacting said fabric material to said contaminated surface results in said nanotubular titania passing through said fabric material and being deposited on said contaminated surface.

* * * * *